E. A. REICHELT.
COMBINED CULTIVATING AND SEED AND FERTILIZER SOWING IMPLEMENT.
APPLICATION FILED SEPT. 5, 1919.

1,355,691. Patented Oct. 12, 1920.
2 SHEETS—SHEET 1.

Inventor.
Ernst Albert Reichelt.

By _Laurence Langner_
Attorney.

E. A. REICHELT.
COMBINED CULTIVATING AND SEED AND FERTILIZER SOWING IMPLEMENT.
APPLICATION FILED SEPT. 5, 1919.

1,355,691.

Patented Oct. 12, 1920.
2 SHEETS—SHEET 2.

Inventor:
Ernst Albert Reichelt
By
Attorney.

UNITED STATES PATENT OFFICE.

ERNST ALBERT REICHELT, OF LORQUON, VIA NHILL, VICTORIA, AUSTRALIA.

COMBINED CULTIVATING AND SEED AND FERTILIZER SOWING IMPLEMENT.

1,355,691. Specification of Letters Patent. Patented Oct. 12, 1920.

Application filed September 5, 1919. Serial No. 321,929.

*To all whom it may concern:*

Be it known that I, ERNST ALBERT REICHELT, a citizen of the Commonwealth of Australia, and resident of Lorquon, via Nhill, in the State of Victoria, Commonwealth of Australia, have invented certain new and useful Improvements in Combined Cultivating and Seed and Fertilizer Sowing Implements, of which the following is a specification.

This invention relates to a particular combination and arrangement of cultivating tines and seed and fertilizer sowing hoes whereby a maximum number of seed sowing furrows are formed when employing this class of machine, so increasing its utility and cheapening the cost of cultivation to a considerable extent.

According to this invention, four rows of spring tines are employed and to each tine of the two middle rows I attach a hoe or sowing tube through which the seed and fertilizer falls to the ground behind the tine.

The invention also combines with the arrangement of the tines four rows deep of a particular staggering of the tines across the machine in relation to each other and by this arrangement the front row of tines loosen or work up the soil to the side of the second following tine row which also works up the ground and feeds the seed and fertilizer to the furrow made by its particular connecting tine, while the third following tine row, to the rear and side of the second tine row also works up the soil and feeds seed and fertilizer to the furrow formed by its connecting tine. The last and fourth row of tines to the rear and positioned to follow a central path between the second and third rows is adapted to loosen the soil and also act as a coverer for the seed sown furrows formed by the second and third rows.

In order that the invention may be more readily understood it will now be described with reference to the accompanying drawings wherein:—

Figure 1:
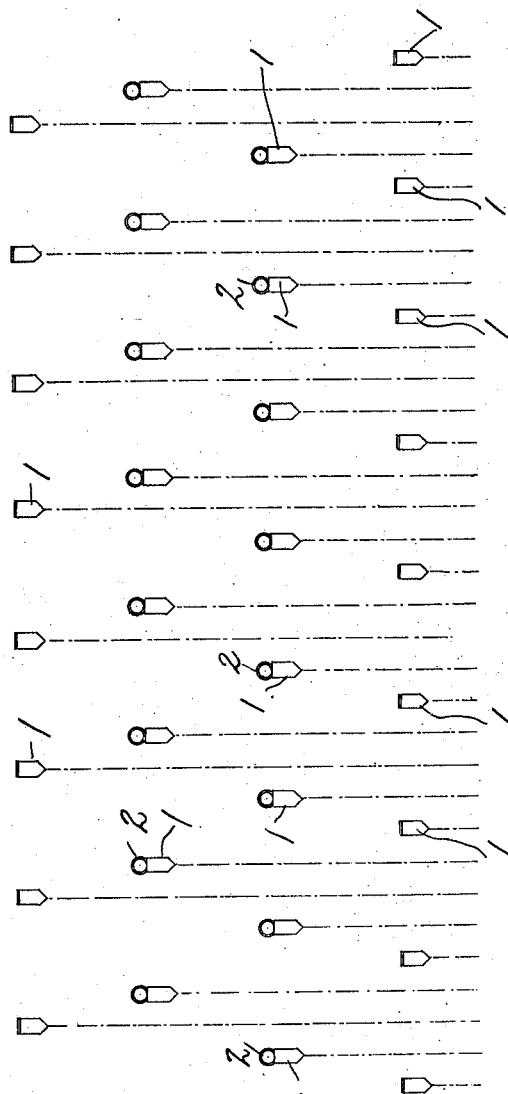
Figure 1 is a diagrammatic view in plan of one form of the staggering of the furrow forming tines as embodied in the invention.
Figure 2:
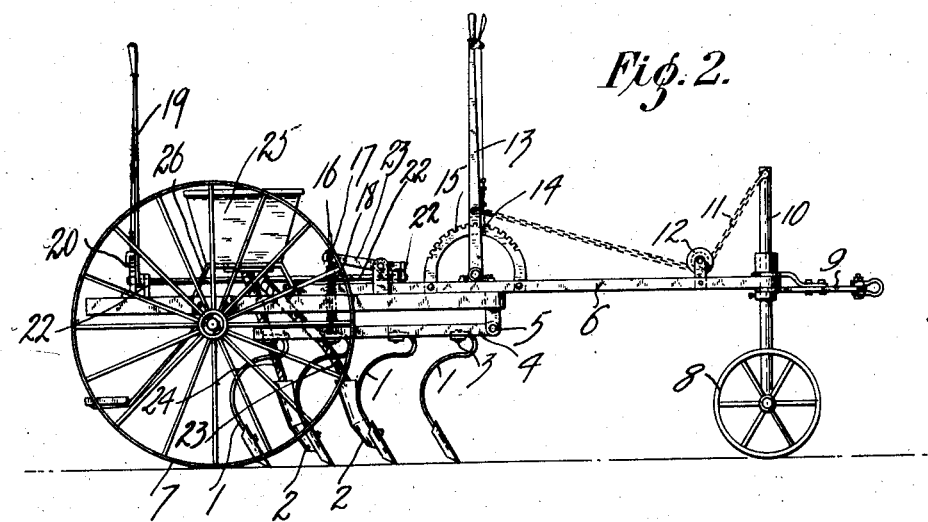
Fig. 2 is a view in side elevation.
Figure 3:
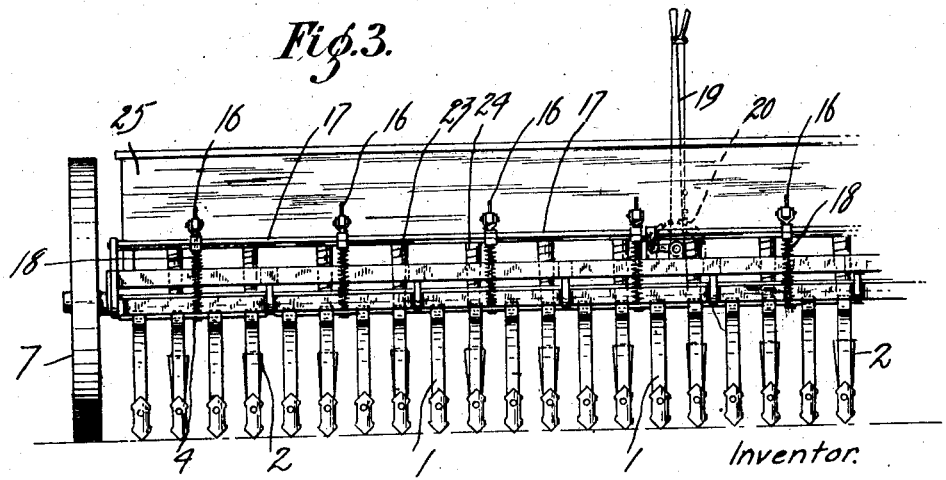
Fig. 3 is a view in front elevation of the improvements embodied in this invention.

According to this invention the tines or teeth 1 are arranged four rows deep and lengthwise of the implement as illustrated in Fig. 1, each row extending across the machine parallel with each other and are staggered as illustrated.

The four rows of spring tines 1 are arranged as illustrated any number being employed according to the size of the machine, while to the rear of the tines 1 on the second and third rows hoes or sowing tubes 2 are fitted.

By staggering the tines 1 as illustrated, the front row of tines $a$ loosens or works up the soil to the side of the second following tine row $b$ which also works up the ground and feeds seed and fertilizer to the furrow made by its particular connecting tine 1 while the third following tine row $c$ to the rear and side of the second tine row $b$ also works up the soil and feeds seed and fertilizer to the furrow formed by its connecting tine. The last and fourth row of tines $d$ to the rear and positioned to follow a central path between the second and third rows $b$, $c$, is adapted to loosen the soil and also act as a coverer for the seed sown furrows.

The tines 1 are staggered as above described and connect cross bars 3 of a stump jump frame 4 pivoted at 5 to the main frame 6 which is provided with main wheels 7 and a front steering wheel 8 as well as draft connections 9. The pillar 10 of the front wheel 8 is connected to a chain 11 which passes around a roller 12 and engages a lever 13 with a pawl 14 engaging a quadrant rack 15 fixed to the main frame 4. The lever 13 is adapted to adjust the height of the steering wheel 8 in relation to the main frame 6.

The stump jump frame 4 slidably connects by the rods 16 with a bar 17 and compression springs 18 are arranged around the rods 16 so that when the lever 19 is adjusted the pressure on the cultivating tines 1 and the depth of cut is also adjusted.

This lever 19 operates across and at the rear of the machine being adjustable in a rack 20 and is connected to the adjusting rod 17 by an arm 22 and other suitable connections. The hoes 2 are connected to the conduits 23, 24 leading from the respective compartments of the grain and fertilizer box 25 mounted upon supports 26 and extending across the frame.

In operation the front row of tines $a$ act as soil looseners, the second and third rows *b*, *c*, prepare the soil and sow the seed and fertilizer, the rear row of tines *d* loosening the soil between the seed sown furrows formed by each pair of seed sowing tines and also act as coverers for the said seed sown furrows as illustrated more particularly in Fig. 1.

I desire it to be understood that the staggering of the tines may be modified without departing from the spirit and scope of the invention, for instance, the row *a* may be either row *b*, *c* or *d*, row *b* may be the front row or the third or the fourth row, row *c* may be the front row, or row *b* or *d* while row *d* may be either the front, second or third row, while it is obvious that the second row *b* may be the third row *c* or the row *c* may be the second row *b* with the rows *a* and *d* in the position illustrated but the preferred arrangement is illustrated in Fig. 1.

What I claim as my invention and desire to secure by Letters Patent is—

In a combined cultivator and seeder, a frame; a row of cultivator teeth mounted on the frame; a second row of cultivator teeth mounted on the frame to the rear of the first row and having seeding tubes attached thereto to sow seed while cultivating the soil, each of said second row cultivator teeth and seeding tubes being disposed at one side and to the rear of a tooth of the first row so that the seeding tubes sow seed to one side of the soil preliminarily prepared by the teeth of the first row and directly to the rear of the soil prepared by the teeth of the second row; a third row of cultivator teeth mounted on the frame to the rear of the second row and having seeding tubes attached thereto to sow seed while cultivating the soil, said cultivator teeth of the third row being disposed at the sides of the teeth of the first row opposite the sides at which the cultivator teeth of the second row are disposed and to the rear of the latter so that seeding tubes of the third row sow seed to the other side of the soil preliminarily prepared by the teeth of the first row and directly to the rear of the soil prepared by the teeth of the third row; and a fourth row of cultivator teeth mounted on the main frame to the rear of the third row of teeth, said fourth row of teeth to the rear and between alternate teeth and seeding tubes of the second and third rows so that each tooth of the fourth row in cultivating the soil covers the seed sown by a pair of cultivating and sowing teeth, one of said pair being in the second row and the other being in the third row.

Signed at Melbourne, Victoria, Australia, this 15th day of July, 1919.

ERNST ALBERT REICHELT.

In presence of—
 SIDNEY HENDLEY,
 A. EAWARD.